United States Patent
Herberger et al.

(10) Patent No.: US 6,888,999 B2
(45) Date of Patent: May 3, 2005

(54) METHOD OF REMIXING DIGITAL INFORMATION

(75) Inventors: Tilman Herberger, Dresden (DE); Titus Tost, Dresden (DE)

(73) Assignee: Magix AG, Berlin (DE)

( * ) Notice: Subject to any disclaimer, the term of this patent is extended or adjusted under 35 U.S.C. 154(b) by 349 days.

(21) Appl. No.: 10/094,684

(22) Filed: Mar. 7, 2002

(65) Prior Publication Data

US 2002/0166440 A1 Nov. 14, 2002

Related U.S. Application Data

(60) Provisional application No. 60/276,626, filed on Mar. 16, 2001.

(51) Int. Cl.[7] .................................................. H04N 5/91
(52) U.S. Cl. ............................... 386/65; 360/18; 84/600
(58) Field of Search ..................... 84/600–603, 609–612, 84/615, 622–625, 634, 648–653, 659–660; 360/18; 369/30.01, 30.18; 711/1; 386/65

(56) References Cited

U.S. PATENT DOCUMENTS

| | | | |
|---|---|---|---|
| 4,351,007 A | 9/1982 | Youngquist | |
| 4,591,926 A | 5/1986 | Gaskell et al. | |
| 4,936,184 A | 6/1990 | Yang | |
| 5,231,239 A | 7/1993 | Tsumura et al. | |
| 5,295,123 A | 3/1994 | Seri et al. | |
| 5,399,799 A | 3/1995 | Gabriel | |
| 5,404,316 A * | 4/1995 | Klingler et al. | ............. 345/723 |
| 5,454,723 A | 10/1995 | Horii | |
| 5,679,913 A | 10/1997 | Pedaso | |
| 5,693,902 A * | 12/1997 | Hufford et al. | ............... 84/650 |
| 5,728,962 A | 3/1998 | Goede | |
| 5,747,716 A | 5/1998 | Matsumoto | |
| 5,877,445 A * | 3/1999 | Hufford et al. | ............... 84/602 |
| 5,913,258 A | 6/1999 | Tamura | |
| 5,952,598 A | 9/1999 | Goede | |
| 6,041,142 A | 3/2000 | Rao | |
| 6,281,421 B1 * | 8/2001 | Kawaguchi | .................. 84/603 |
| 6,410,837 B2 * | 6/2002 | Tsutsumi | ..................... 84/604 |
| 6,546,299 B1 * | 4/2003 | Bradley | ..................... 364/514 |

* cited by examiner

*Primary Examiner*—Robert Nappi
*Assistant Examiner*—David Warren
(74) *Attorney, Agent, or Firm*—Fellers, Snider, Blankenship, Bailey & Tippens, P.C.

(57) ABSTRACT

There is provided herein a method of defining and storing remixing of existing musical and video works. As a first step, various segments of a digital song or video work are identified, preferably in terms of their starting and ending times. Given the defined loops or video clips, the user next forms a remix of the selected song/video work using those components. The final product, i.e., the resulting remix, can then be completely specified in terms of the loop/clip definitions together with the time at which each of the defined loops/clips appears in the final mix. The remix can thus be compactly stored as a computer file.

6 Claims, 4 Drawing Sheets

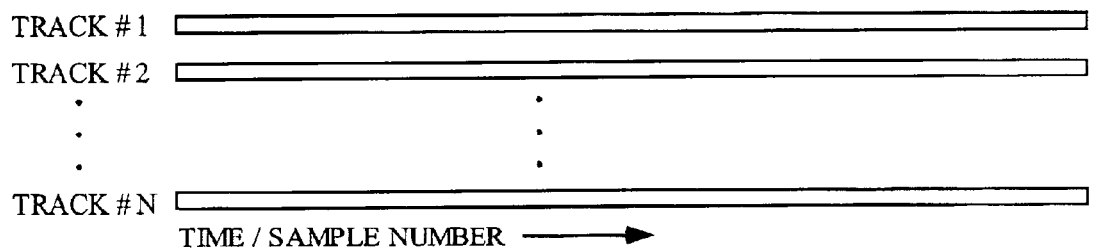
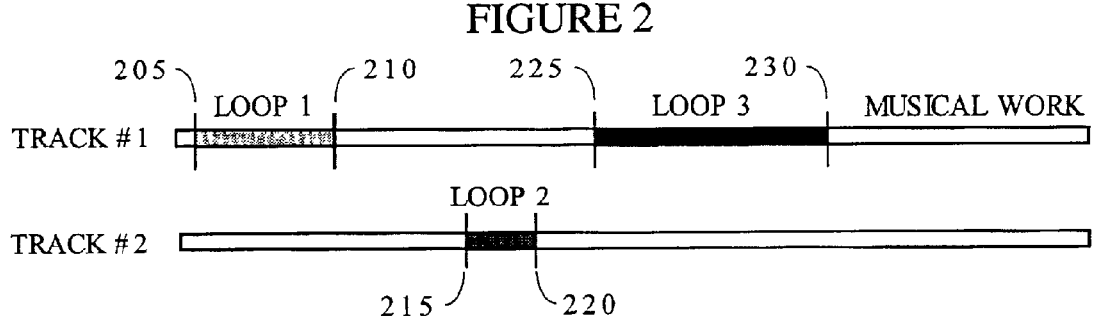
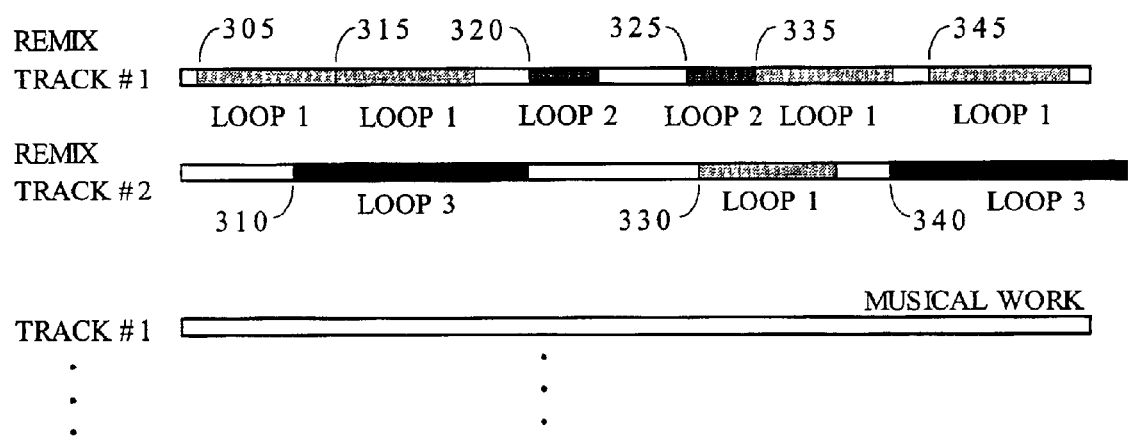

METHOD OF REMIXING DIGITAL INFORMATION

This application claims the benefit of provisional application Ser. No. 60/276,626, filed Mar. 16, 2001.

The present invention relates to the general subject matter of creating recorded performances and, more specifically, to methods for remixing prerecorded musical compositions, video works, etc.

BACKGROUND OF THE INVENTION

Within the field of music recording, the term "remix" has traditionally been used to describe the process of recombining audio tracks or channels from a recording to produce a new or modified audio recording. That is, performers have long offered "remixed" versions of their songs, wherein producers and/or engineers would recombine tracks previously recorded (or tracks newly recorded for use in the remix) to produce a different recording variation of the same song.

Previously this sort of remixing was done by analog means, wherein separately recorded analog tape tracks which might contain, by way of example, different instruments or instrument groups, were rebalanced and/or filtered and recombined onto a traditional stereo tape. Additionally, skilled audio engineers might physically cut the recording into pieces and reassemble the pieces (typically by taping them together) so that the resulting composition played in a different order.

Today, however, new technologies have been developed which make it possible for end-users to remix songs using their personal computers. The advent of the digital music (as might be found recorded, for example, on audio CD's, found within MP3 files, etc.) combined with sophisticated software to manipulate same, have opened up a new possibilities for the professional and non-professional user.

As a specific example, many of the computer programs that allow a user to manipulate digital music now provide for "interactive remixing". Remixing in the modern sense includes, not just the formation of static rearrangements of an existing musical work, but also the production of more dynamic creations, wherein a user "plays along" with a recording created by another and adds, for example, drum hits, scratches, etc., to the original performance, the composite being termed a "remix" of the original. Obviously, this same technology can be easily adapted to also allow a user to create a new song, if that were to be desired.

One problem with conventional remixes is that the amount of space necessary to store each remix is the same as (or even larger than) the original song. The user might want to have many remixes of a song stored on disk during the process of creating a "best" mix according to the user's taste. However, if the user desires to store multiple remixes of the same song, multiple large digital recording files must be stored for each mix. (For example, in the case of MP3 files, about 1 meg per minute of recorded song must be stored). Further, if the user would want to share such a remix with a friend, it would be necessary to transfer the entire digital file to the other user, which might make using convention e-mail prohibitive.

Additionally, the aforementioned problems apply with equal force to the remixing of other performance-based digital information. As a specific example, the user who desires to "remix" digital video information is faced with similar transmission/storage problems. That is, the user who wishes to create a new video "composition" from an existing one, must extract sections of the video, reorder those sections, and then write the entire rearranged "mix" of video information back to storage. As before, if the user wanted to create multiple "arrangements" of the video work, each such work would necessarily be separately stored in its entirety, which would require multiple megabytes of storage. Similarly, if that user desired to send the new video work to another user, the full digital work would need to be transmitted.

Thus, what is needed is a method of storing a remix of a digital work that offers significant compression over that currently available. Additionally, the method should create a remix file that may be separately stored and transmitted, independent from the underlying musical or video work from which it was assembled.

Heretofore, as is well known in the music and video industries, there has been a need for an invention to address and solve the above-described problems. Accordingly, it should now be recognized, as was recognized by the present inventors, that there exists, and has existed for some time, a very real need for a device that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

There is provided hereinafter an improved method of defining and storing remixes of existing musical works which provides a more compact method of storing such a remix and one which is independent of the underlying song from which the remix was constructed.

According to a first preferred embodiment, there is provided a method of storing digital remixes that begins with the selection of a song to be remixed. As a next step, various segments of the song are identified, preferably in terms of their starting time and ending time. Each of these segments will be used as a "loop" or discrete sound component in the next step. It should be noted that the length of each loop might be only a few digital samples, or the length of the entire song. Obviously, the loops might be selected by the user or predefined.

Given the defined loops which have been extracted from the original song, the user next creates a remix of the selected song. This might be done in many ways, but a first preferred method would be to allow the user to manually select the time-position of each of the loops according to his or her preference. Or, alternatively, the user might interactively create his or her own composition in real time by "playing" each loop at the time it is to appear in the new mix.

Either way, each time the user positions a loop in the remix the time at which the loop is placed is recorded. In this manner, the final product, i.e., the resulting remix, will be completely defined in terms of the loop definitions (e.g., starting and ending times in the original song) together with the time at which each of the defined loops appears in the final mix. As a consequence, the collection of time data that defines the resulting remix may be compactly stored in a computer file completely independent from the underlying work from which the remix was created. The user's remix has thus been compacted into a few kilobytes of information, in contrast to the multiple megabytes that would otherwise be required.

According to another preferred embodiment of the instant invention, there is provided method of digitally remixing serially presented information generally as described above, but wherein the digitized subject matter is taken from a video source. More specifically, the instant embodiment defines video clips in an existing digital video work by specifying a starting and an ending time (or frame number). The user is then allowed to position the defined clips in time for subsequent playback as a new video "mix." Additionally, the user might choose to have a simple "mix" that occupies the entire screen of the display device, or a more complex arrangement that involves multiple windows within a single (or multiple) video display device.

As a next optional step, the user will preferably be given the opportunity to edit the resulting remix. Each time the user moves, deletes, or creates a loop in the final mix, the instant method will similarly edit the information that defines the remix.

The foregoing has outlined in broad terms the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Additionally, the disclosure that follows is intended to apply to all alternatives, modifications and equivalents as may be included within the spirit and scope of the invention as defined by the appended claims. Further, it should be understood that the phraseology and terminology employed herein are for the purpose of description and should not be regarded as limiting, unless the specification specifically so limits the invention. Further objects, features, and advantages of the present invention will be apparent upon examining the accompanying drawings and upon reading the following description of the preferred embodiments.

BRIEF DESCRIPTION OF THE DRAWINGS

FIG. 1 contains a schematic illustration of a typical prerecorded musical work.

FIG. 2 illustrates how loops are defined and extracted from the musical work.

FIG. 3 illustrates how a user might create a remix of the original musical work by playing selected loops at specific times in concert with the playing of the underlying musical work.

DETAILED DESCRIPTION OF THE PREFERRED EMBODIMENTS

Figure 8:
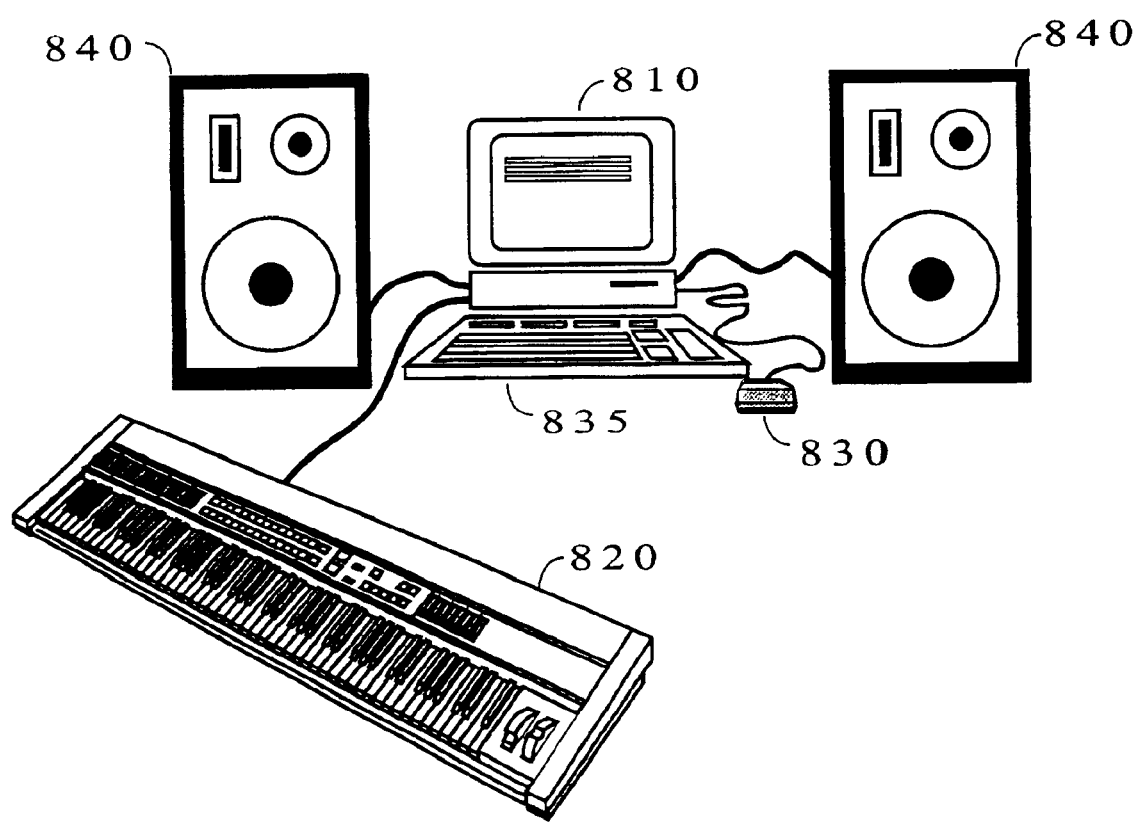
FIG. 8 illustrates the general environment of the invention.

As is illustrated in FIG. 8, in a preferred arrangement the instant invention will utilize a computer 810 that has some capacity for reading digital storage media, e.g., that device might be a CD reader/writer, etc. Further, and is customary in the industry, the computer will preferably be equipped with a conventional computer keyboard 835 and mouse 830. Additionally, and is common in many multimedia systems, one or more external speakers 840 may be attached to the audio output of the computer 810 for use in reproduction of music that is read and played thereby. Still further, external electronic keyboard 820 might also be provided which would be useful, for example, in entering and playing musical notes. As is indicated in FIG. 8, the musical keyboard 820 is commonly placed into electronic communication with the computer by way of a MIDI or other instrument interface. Of course, those skilled in the art will recognize that the electronic keyboard 820 need not be restricted to playing "notes" but, and this is especially true with so-called sampling keyboards, each key might be assigned a different sound or "loop" which would play when the associated key on the keyboard 820 is pressed. Of course, those of ordinary skill in the art will recognize that there are many variations and combinations of the equipment of FIG. 8 that would function according to the teachings of the instant invention.

According to a preferred aspect of the instant invention there is provided an improved method of creating and storing remixes of digital musical works. This method compactly stores time-based information that defines the remix, rather than the actual audio/video work that results, and is, thus, independent of the music or video source from which it was created.

As is generally illustrated in FIG. 1, a recorded work of music may be thought of as a series of sounds played sequentially or in parallel as a function of time. Although the casual user might think of a musical work as consisting of only two tracks (i.e., a left and a right channel which are conventionally utilized in stereo), those skilled in the art will recognize that it is customary to utilize many more tracks during the process of creating a musical work. FIG. 1 illustrates such a general situation.

Of course, those skilled in the art will recognize that digital music is a collection of sound samples collected at some predetermined and fixed sample rate, typically at about 40,000 samples per second or higher. Thus, each digital sample may be associated with a specific time as measured from the start of the song. Clearly, the sample number as measured from the start of the song and the time at which that same sample occurs when the music is played are interchangeable means of location within a musical work. Of course, SMPTE time codes are often used in the music and video arts and would be appropriate for use with the instant invention.

Given the song of FIG. 1, it is desired to allow a user to make a remix of this musical work (i.e., the "base work") preferably using only information (i.e., sounds or "loops) that may be found within the song itself. This is done as follows.

As is illustrated in FIG. 2, the user is allowed to specify certain sections of the base work that are to act as "loops". (Alternatively, the loops might be pre-selected by the author of the remixing program). In either case, each loop is uniquely identified by noting the starting and ending sample number (or time) within the song over which the loop is defined. For example, Loop 1 in FIG. 2 is uniquely identified by a knowledge of the starting time (or sample number) 205, the ending time/sample number 210, and the track in which the loop is found. Loops 2 and 3 are similarly defined in terms of their respective starting and endings times (215–220, and 225–230, respectively) and track numbers. (For purposes of illustration, only three of the possibly many tracks (e.g., "N" tracks in the figure) of the musical work have been shown). That being said, at minimum the instant invention requires that the base work consist of at least one track (e.g., be a monophonic composition).

The foregoing time boundaries define the loops for purposes of the next step, which is the step of creating the remix. As is generally indicated in FIG. 3, according to the preferred embodiment a user may place each of the defined loops at any time position he or she might desire in creating the remixed work and, of course, many variations are possible. Although the remixed work might take many forms, it is required that it have at least one track (i.e., required to be at least monophonic) so that the loops may be positioned therein for purposes of later reply. In one preferred embodiment, each such loop placement will complement the music in the underlying musical work as it is played. That is, the user might choose to "play along with" or accompany (FIG. 3) the underlying or "base" musical work using the defined loops as building blocks from which to construct a composition. In such an arrangement, software will monitor which loop is played and the time (e.g., the starting times 305–345) at which the loop is played within the song. In another preferred arrangement, the user will be constrained in the placement of his or her loops so that the resulting remix is "harmonious" according to some standard (e.g., aesthetic or mathematical) defined by the author of the software.

In still another preferred embodiment, the user will be allowed to position the loops independently from the underlying musical work. That is, in this embodiment the user will be offered an opportunity to use sounds from one song to create a completely new composition which may not bear much resemblance to the underlying work from which the songs were taken. As before, the time (and, optionally, the track) at which is each loop appears will be noted for later storage and playback.

Figure 4:
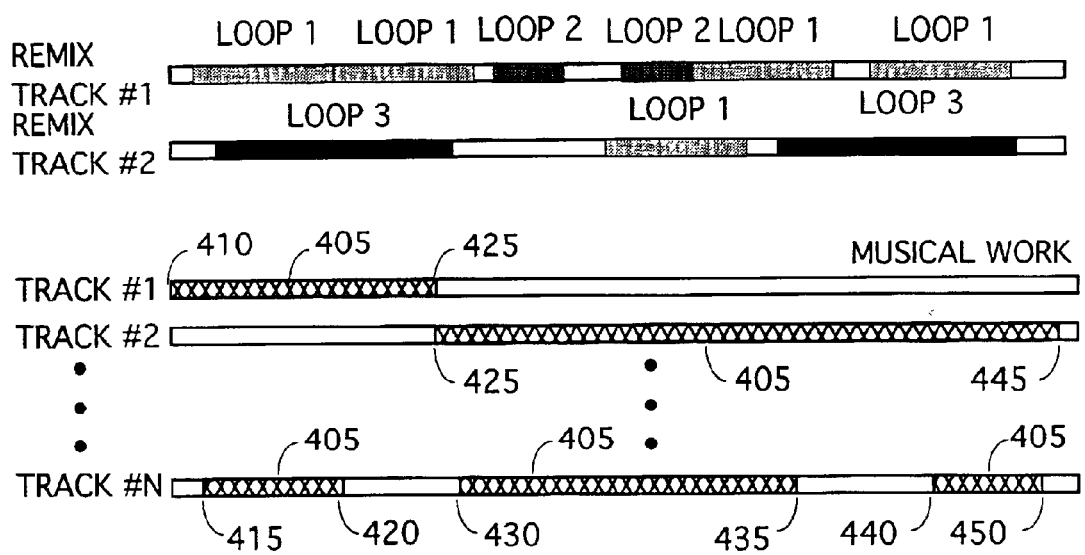
FIG. 4 contains a schematic illustration of how pieces of the original musical work can be used in the final remix by muting/unmuting the tracks of the musical work.

Also, it should be noted that, as is generally indicated in FIGS. 3 and 4, the loops may be defined to sound within multiple tracks, e.g., it is possible that two or more loops might overlap or play simultaneously (including two copies of the same loop if that were to be desired). Thus, the instant inventors specifically contemplate that the loops that are positioned in time (or played sequentially) by the user might occur either in serial or parallel. FIG. 4 illustrates in a general way how various "mix tracks" might be created that play in parallel in the remix. Of course, although FIG. 4 illustrates the use of only two such tracks, the use of many more tracks is commonly done and the creation of such multi-track musical works is common in the industry. Additionally, it should be clear that at least one track must be used to form the remixed musical work.

As a next optional step, the user would normally be given the option of editing the just-created mix to suit his or her taste. This might be done in many ways including, without limitation, recording over one or more of the tracks just created, moving loops around in the final mix via a graphical use interface, direct editing of the start/end times of the loops in the remix, etc. Those skilled in the art will recognize that there are many ways to allow the user to edit the remixed musical work.

As a next step, the information that defines the instant remix is stored, preferably by writing it to disk. Note that the entire performance/remix may be stored by noting (a) the time-definitions of the loops (e.g., starting time and ending time and, possibly, track number in the base work) and (b) the time at which each loop plays in the remix. Thus, the information that is stored is completely independent of the music from which the remix was created. Further, this method of storage allows a multi-megabyte performance to be stored in a few hundred bytes of storage.

As is illustrated in Table 1, in a preferred embodiment the information that defines each loop is stored in a single computer file, which information preferably takes the form of time and, optionally, track data. Note that the information that is stored hereinafter is only useful when the original song from which the loops were taken is available.

TABLE 1

Stored Loop Information

| Loop Number | Start Time | End Time | Track Number |
| --- | --- | --- | --- |
| Loop #1 | $t_1$ | $t_2$ | 1 |
| Loop #2 | $t_3$ | $t_4$ | 2 |
| Loop #3 | $t_5$ | $t_6$ | 1 |

The time values, $t_1$ to $t_6$, correspond to loop positions 205 through 230 in FIG. 2 and might be, by way of example only, time measurements recorded to the nearest thousandth of a second. Of course, it should be clear to those skilled in the art that a starting time and a loop length (or an ending time and loop length, etc.) could be stored instead of the starting and ending time, as all of these variations contain equivalent information. Thus, in the text and claims that follows it should be understood that whenever the start/end time of a loop is mentioned, that language will apply equally to any other indicator of location and length including, without limitation, start time/length, starting sample number/length in samples and any other combination which would allow a loop to be unambiguously identified within a musical work. In those circumstances where the base work consists of a single track, recording a track number would not be necessary.

Additionally, the time (and optionally, a track number) at which each loop appears in the final mix is stored. The sort of information that would preferably be stored in a remix file is illustrated in the table that follows.

TABLE 2

Stored Play Information

| Loop 1 (Time/Track) | Loop 2 (Time/Track) | Loop 3 (Time/Track) |
| --- | --- | --- |
| 305/1 | 320/1 | 310/2 |
| 315/1 | 325/1 | 340/2 |
| 330/2 | | |
| 335/1 | | |
| 345/1 | | |

In the previous table, the time position of each loop has been recorded, along with an optional track number for multi-track arrangements. For example, in the remix Loop 1 is to be played first at time 305 and on Track #1. It is to be played again at time 315 in Track #1, etc. Note that it is specifically contemplated that multiple loops might be played at the same time in different tracks (or combined together for play within a single track) and may or may not be started simultaneously. Additionally, and as is illustrated above, it is contemplated that the same loop might be reused multiple times within the remix and, if necessary, the loop might be "pitch shifted" or otherwise algorithmically modified to make it blend more harmoniously into the resulting musical work. This is the sort of information that would preferably be stored in a data file that defines the remix.

Finally, if the user desires to make all or part of the original song a part of the final mix, as has been generally illustrated in FIG. 4, those portions of the song that are to sound during the final mix must be defined. In FIG. 4, a mute 405 (i.e., a silencing of the track during the time periods indicated) has been applied to various sections of the original musical work. Each mute is uniquely defined by its starting/ending time and track number. Thus, optionally this information might also be stored as part of the remix file.

TABLE 3

Stored Mute Information

| Track #1 (Mute Start/End) | Track #2 (Mute Start/End) | . . . | Track #N (Mute Start/End) |
|---|---|---|---|
| 410/425 | 425/445 |  | 415/420 |
|  |  |  | 430/435 |
|  |  |  | 440/450 |

Of course, those skilled in the art will recognize that, instead of storing the start/end time of each muted interval, that the start and end of each unmuted section could be stored, the starting time and length of the mute internal might be stored, etc.

Preferably, all of the above-identified information will be stored in a single file. Note that this information, consisting preferably as it does of times values, is completely independent of the underlying song (although the underlying song must be made available in order to reconstruct the user's remix). However, the information listed above can be stored very compactly and, a remix that might have taken many megabytes to store as digital audio, can be stored in a few kilobytes as a collection of times, sample numbers, track numbers, etc.

Finally, on playback the process is reversed. First, the time information pertaining to the loop definitions is read from storage along with a copy of the base work from which the remix loops were drawn. A a preferable next step, the building-block loops are extracted from the base work using the start/stop times which define them. Next, each loop is positioned in time (and track number) according to the user's remix. Then, the muted/unmuted sections of the original song are determined and applied. Finally, the resulting composition is performed, preferably by playing it through the speakers of a multi-media computer. Of course, those of ordinary skill in the art will recognize that other hardware configurations are certainly possible and have been specifically contemplated by the instant inventors.

The instant inventors have additionally contemplated that further steps might be included in the remixing process that would assist the user in forming the new arrangement. For example, since it is not uncommon for the tempo (i.e., the number of "beats per minute" or "BPM") of a musical work to change during the song, a loop selected from the first of the song might be slightly (or substantially) out of tempo with a loop collected from the end. This might occur for many reasons, but examples of why such might occur include human variations (i.e., it is very difficult to play at a mathematically precise tempo throughout a song) and/or musical works wherein true changes in the tempo occur in different passages. In either case, it might not be possible to automatically combine loops that are collected from different sections of the song because of BPM differences. In those sorts of cases, the loops in question would preferably be mathematically stretched or compressed to cause the various BPM's to all match. Methods of doing so are generally well known to those of ordinary skill in the art.

Another optional step would be to adjust one or more of the selected loops in pitch to make those loops more harmonious with the user's remix arrangement. That is, those of ordinary skill in the art recognize that a sound loop extracted from one portion of a song might not always be usable exactly as it is. For example, a user might wish to take a series of musical notes that are played in the key of C and transpose those notes so that they could be used with an accompaniment playing in the key of F. In such a case, it is possible to pitch shift the loop upward or downward to make it useable as the user desires. Such operations are well known to those of ordinary skill in the art.

Figure 5:
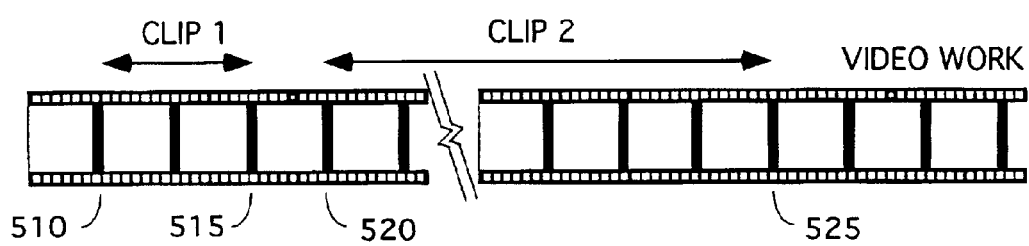
FIG. 5 illustrates how clips or "loops" might be extracted from a pre-existing video work by specifying a starting time and an ending time.
Figure 6:
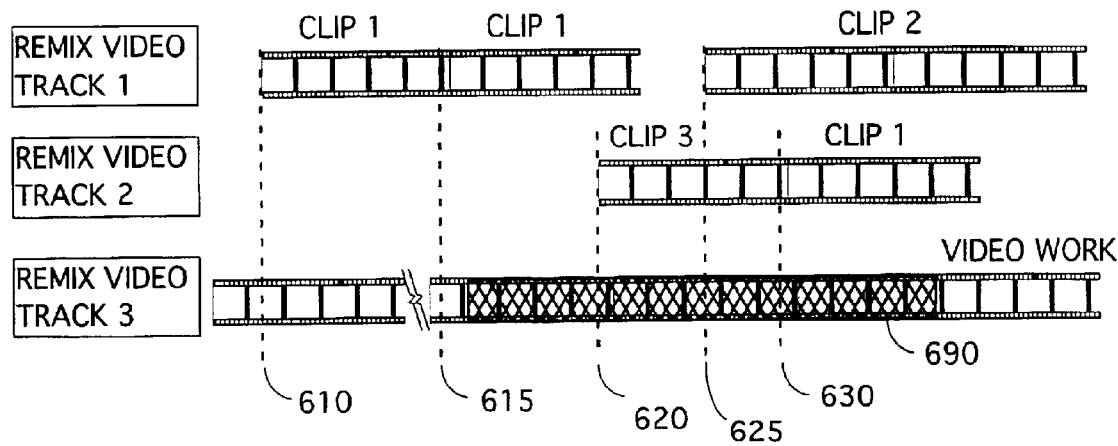
FIG. 6 contains a schematic illustration of how a video work may be defined by the playback time positions of multiple pre-defined clips together with "mutes" that are applied to the underlying video work.

Turning now to the embodiments of FIGS. 5 and 6, according to another preferred embodiment of the instant invention there is provided a method generally as described above, but wherein the method is applied to other sorts of serially presented digital information such as digital video. As is well known to those of ordinary skill in the art, digital video consists of a series of digitized images ("frames") that are presented sequentially to a user, preferably at a rate of about 60 frames per second. Additionally, audio information (e.g., a "sound track") might accompany the video information and might contain dialog, background music, sound effects, etc.

FIG. 5 illustrates a preferred embodiment of the instant invention, wherein the user defines various video clips (which are analogous to the "loops" discussed previously) by specifying a starting time and an ending time within the base video work. In that figure, time points 510 and 515 define a first video "clip", times 520 and 525 define a second video clip, etc. Note that, although the discussion that follows will assume that a "time" has been used to define the extent of the various clips, alternatively the instant invention could operate with a video frame number, or any other measure of the distance of a particular image into the video work. Of course, an industry time measurement standard such as SMPTE time codes would preferably be used to define the starting and ending clip boundaries.

FIG. 6 illustrates how various video clips could be combined ("mixed") to form a new video work in the same general manner as has been discussed previously. For example, in FIG. 6 the user has indicated that he or she wants "Clip 1" to play three times in the final work (first at time 610 and then again at times 615 and 630). "Clip 3" has been positioned to bridge the "gap" between the clip at time 615 and "Clip 2" which plays at time 625. Note that "Clip 3" is positioned so as to play simultaneously with the ending of "Clip 1" and the start of "Clip 2". According to the desires of the user, the frames that overlap might be handled in any number of ways including, by way of example, playing both clips simultaneously (either by "adding" together the two video images to produce a single composite image, playing them in different regions/windows of the screen, etc.) or creating transitions into and out of Clip 3 at its beginning and ending through the application of any of a host of other transition effects (wipes, fades, etc.) that are well known to those of ordinary skill in the art.

Further, note that the example of FIG. 6 calls for Clip 1 (at time 630) to play simultaneously with Clip 2. Again, this might be handled in any number of ways including, for example, playing the two clips simultaneously in a single display window, playing them simultaneously in separate windows, etc. Clearly, the same computer program that allows the user to position the clip in time for playback could accept directions from the user as to precisely how the final work should be composed. Further, by storing the bounding coordinates of each window on the display device 700 in FIG. 7B, optionally together with each window's display priority (i.e., whether a given window lies above or below any widow it overlaps), information relating to the display of each video track within a multi-window display may be compactly stored for use during replay. Needless to say, the display windows need not be exclusively rectangular. Thus, when the term "bounding coordinates" is used herein, that phrase should be interpreted in its broadest sense to include any combination of constants or mathematical expressions that define a window within the coordinate system of the display device (e.g., a center point and a radius defines the boundaries of a circular window).

Note also that the instant inventors contemplate that the user might wish to use all or part of the underlying or base video work as part of the final video work. FIG. 6 generally indicates that the source video work might be "muted" (i.e., made invisible or blacked out) at different times according to the desires of the user, with the muted base video work comprising the third "remix" video track in that figure. As has been explained previously in connection with the audio embodiment, the muting pattern 690 that is to be applied to the original video work can easily be specified by noting the various starting and ending times/frame numbers of any such mutes.

Figure 7A:
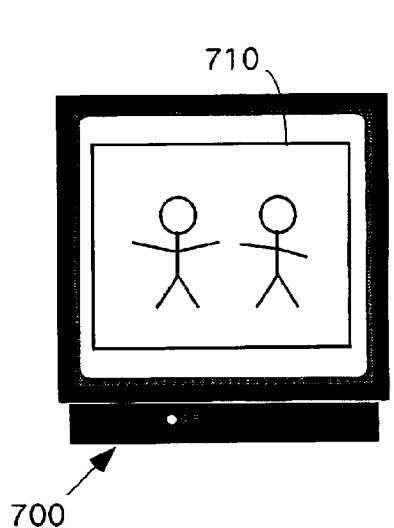
FIG. 7 illustrates preferred display embodiments which utilizes a single (FIG. 7A) and multiple (FIG. 7B) display regions within a display device.
Figure 7B:
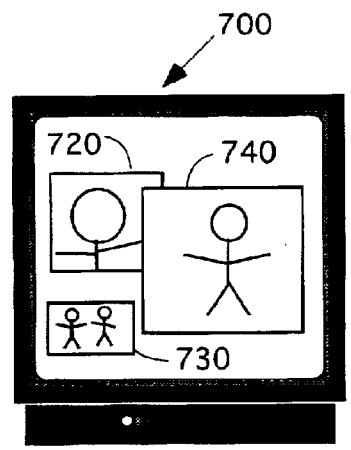

As is generally illustrated in FIGS. 7A and 7B, the output video work might be displayed within a single window 710 of display device 700, i.e., the various remix video tracks created in the previous step might be made into a single composite track for display purposes. Alternatively, each track might be assigned to a separate "window" of the display device, so that the various clips play within the associated window at the indicated specified by the user (e.g., in FIG. 7B windows 720, 730, and 740 which play the content respectively of remix video tracks 1, 2, and 3). Obviously, combinations of these two approaches (e.g., a single window at one time and multiple windows at others) could also be used depending on the desires of the user.

Of course, it is conventional to have an audio track accompany a video work and the instant method could easily be adapted to move the existing audio information along with each user-defined clip so that the associated audio would play each time its video loop was played. Of course, that sort of treatment might make sense for some sorts of audio (e.g., dialog and sound effects) but not others (e.g., the background music). Alternatively, the user might elect to compose a new sound track by using sound loops taken from the base video work, in which case the new audio work be treated as a separate musical composition and would preferably be handled as has been discussed previously.

The final product of the above-discussed steps is a collection of times (and, optionally, window numbers/coordinates, track numbers, etc.) which define a remixed video work without any reference to the underlying work. The resulting "mix" can be stored and transmitted in a very compact fashion compared with the amount of data that would need to be stored to transmit the mix itself. The method of reconstructing the video arrangement from the times and other data that have been specified by the user proceeds exactly as has been described previously for the audio-only embodiment.

Finally, it should be noted that the above method has produced a compact data file which defines a musical, video, or combination, "mix" in a very compact fashion and without reference to the underlying work. Of course, the underlying work is still needed when the remixed work is reconstructed, but only a single copy of that work need be maintained on disk, even though the user has created a multitude of different arrangements of it. Additionally, when the term "store" or the phrase "store on computer readable media" is used herein, that term/phrase should be understood in its broadest sense to include compact disks ("CD"), CD-R, CD-RW, DVD, DVD-R, DVD-RW, magnetic disk, magnetic tape, magneto-optical disk, RAM, EPROM, non-volatile RAM, or any other storage or mass storage hardware suitable for holding digital information therein for later recall.

Other preferred embodiments of the instant invention might include the ability to store, in addition to the defining time information, a loop volume (e.g., velocity information in the case of a keyboard instrument) or other performance/controller information that should be applied when the loop is played in the remix. For example, by storing a volume along with the time at which each loop is played, the user may create remixes that include different dynamics throughout or one in which the various tracks are increased/decreased in volume relative to each other. Other controller information, such as pitch bend data, breath controller data, etc., could similarly be stored for later application during the playing of the remix.

In summary, the instant invention is allows the user to create a highly compact data file that completely expresses a remix of an existing musical and/or video work and which is not dependent on the particular work that is remixed. By recording the starting time and length of each loop in the base work, together with occurrence time and track number of each appearance of each loop in the remixed work, the instant invention can store in a few kilobytes information that might otherwise require several megabytes. Although the instant invention preferably utilizes portions of the original work in the remix, it should be noted that, if desired, other loops could be imported into the mix (e.g., drum loops, etc.) to be played along with the remix that has been created from the sounds in a single musical/video work. However, in this case, it would be necessary to provide the original loop/video clip and store it, along with the loops/clips taken from the original work, in order to reconstruct the final mix.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of storing a remixed video work, wherein is provided a base video work and a plurality of video loops drawn therefrom, each of said plurality of video loops having at least a starting time and an ending time within said base video work associated therewith, comprising the steps of:

(a) using at least a portion of said video of loops to form a remixed video work, (a1) wherein said remixed video work consists of at least one display window, (a2) wherein at least one of said at least one display windows is for playing at least two of said plurality of video loops therein, and, (a3) wherein each of said plurality of loops used in said remixed video work has at least a starting time within said remixed video work associated therewith;

(b) determining at least a remix starting time associated with each occurrence of each of said plurality of video loops used in said remixed video work;

(c) storing on computer readable media values representative of each remix starting time determined in step (b); and, (d) storing on computer readable media values representative of said starting time and said ending time within said base video work of said loops used to form said remixed video work, thereby storing a representation of said remixed video work.

2. The method according to claim 1, wherein the remixed video work comprises a plurality of display windows and wherein at least one video clip is displayed in a first display window and wherein a plurality of video clips are displayed in a second window.

3. The method according to claim 2, further comprising the steps of:

(e) determining the bounding coordinates of each of said plurality of display windows; and, (f) storing on computer readable media values representative of said bounding coordinates of said plurality of display windows.

4. The method according to claim 1, wherein the computer readable media of steps (c) and (d) is chosen from the group consisting of computer RAM, computer ROM, a PROM chip, flash RAM, a ROM card, a RAM card, a floppy disk, a magnetic disk, a magnetic tape, a magneto-optical disk, an optical disk, a CD-R disk, a CD-RW disk, a DVD-R disk, or a DVD-RW disk.

5. A device adapted for use by a digital computer wherein a plurality of computer instructions defining the method of claim 1 are encoded, said device being readable by said digital computer, said computer instructions programming said digital computer to perform said method, and, said device being selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

6. A method of displaying said remixed video work, wherein is provided said computer readable media of claim 1 and said base video work, comprising the steps of:

(a) reading from said computer readable media at least a portion of said stored values representative of each remix staring time within said remixed video work;

(b) reading from said computer readable media at least a portion of said values representative of said video loop starting times and ending times within said base video work;

(c) using said read values representative of said video loop starting times and ending times to extract from said base video work a plurality of video loops corresponding thereto;

using at least said read remix starting times and extracted plurality of video loops to display at least a portion of said remixed video work.

* * * * *

UNITED STATES PATENT AND TRADEMARK OFFICE
CERTIFICATE OF CORRECTION

PATENT NO. : 6,888,999 B2
DATED : May 3, 2005
INVENTOR(S) : Herberger et al.

It is certified that error appears in the above-identified patent and that said Letters Patent is hereby corrected as shown below:

Column 12,
Line 22, the word "staring" should be replaced by the word -- starting --

Signed and Sealed this

Twelfth Day of July, 2005

JON W. DUDAS
*Director of the United States Patent and Trademark Office*